UNITED STATES PATENT OFFICE.

ALBERT L. LAWTON AND ARTHUR W. LAWTON, OF NEW YORK, N. Y.

PROCESS OF PRESERVING ALIMENTARY SUBSTANCES, &c.

SPECIFICATION forming part of Letters Patent No. 602,793, dated April 19, 1898.

Application filed December 31, 1897. Serial No. 665,180. (No specimens.)

*To all whom it may concern:*

Be it known that we, ALBERT L. LAWTON and ARTHUR W. LAWTON, citizens of the United States, residing at New York, in the county of New York and State of New York, have invented a new and useful Method of Preserving Alimentary and other Organic Substances, of which the following is a specification.

Our invention has for its object to provide a method of preserving fruits and other organic substances or objects, particularly of the fruit, vegetable, grain, and analogous classes, wherein the removal or detachment of the object from the tree, vine, or stalk upon which it has grown does not check development.

Fruit, vegetables, berries, and similar alimentary substances are known to ripen or develop subsequent to their removal from the parent stem or stalk, and we have found by experiment that organic substances of the above and other analogous classes absorb oxygen and throw off carbonic anhydrid or carbonic-acid gas, ($CO_2$.) This can be ascertained by placing a fruit or analogous object in a sealed jar containing atmospheric air or oxygen, and subsequently analyzing the contents of the vessel. We have also found by experiment that fruit and similar substances from which oxygen is excluded for a period of time, varying according to the fruit, (while the development of the subject will cease, and in appearance it may remain as when first exposed to the named conditions,) will deteriorate in flavor, if it does not entirely vanish, and the fruit will lose the peculiar fresh taste which it had when detached from the stalk or tree, and in many cases the removal of the fruit from the receptacle in which it has been stored will result in a disintegration indicating that all life is extinct. Under no circumstances can organic objects, such as fruit or vegetables, from which oxygen has been excluded for a sufficient length of time to bring about this extinction of life be forced to revive and continue development to ripeness.

Inasmuch as fruit and other analogous substances exposed to normal conditions will develop, and after becoming fully ripe will deteriorate by reason of the continuation of the combustion due to the absorption of oxygen, whereas the same substances from which oxygen is entirely excluded not only cease to develop, but lose that existence or life which is displayed in the absorption of oxygen or other combustion-supporting agent, it follows that if the substances named can be supplied with only a sufficient quantity of oxygen or analogous combustion-supporting agent to support that existence or life or supply the waste, and insufficient to promote development, fruit may be maintained indefinitely in a state of perfect preservation without signs of either deterioration or development, and yet upon exposure under conditions where a greater supply of oxygen is furnished the necessary development to bring the fruit to a state of complete ripeness may be accomplished. In other words, if the fruit, vegetables, and similar substances can be maintained in their original condition of life, as when detached from the tree, stalk, or vine, without allowing development, the exposure thereof under normal conditions, as to atmospheric air, will result in the carrying on of the operation of development which was interrupted by the exposure of the fruit to the abnormal conditions mentioned. Therefore the object of our invention is to provide a process or method of treatment by which fruit, vegetables, or similar substances will be reduced to a condition of suspended animation analogous to that condition referred to in connection with animal life as "coma," whereby after the suspension of the conditions resulting as described and the exposure of the fruit to atmospheric air or to a larger percentage of oxygen the development of the substances will be renewed or continued as from that point existent at the time of exposure to the abnormal conditions. We have found in practice, however, that this suspension of development due to the prosecution of our process delays the development of the fruit after removal from said conditions. For instance, it requires more or less time for fruit to revive from the effect of the process according to the length of time during which they have been exposed thereto, but that the ultimate revival will be followed by a steady development until the fruit reaches that state of ripeness which it would have reached had it been exposed throughout to a normal atmosphere.

In carrying out our invention we employ an air-tight receptacle, either a room, vault, or other storage-chamber, such as that of a freight-car or vessel or a portable container, and into this receptacle we inject a fluid comprising nitrogen, carbon monoxid or protoxid, (CO,) otherwise known as "carbonic oxid," and oxygen, this fluid being introduced to the exclusion of atmospheric air. The percentages of these gases vary according to the temperature and the particular fruit, vegetables, or berries which are to be preserved. The proportions may be stated as nitrogen, approximately seventy-six per cent., carbon monoxid, twenty per cent. or more, and oxygen, from one-half of one per cent. to five per cent. For instance, grapes require only about one-half of one per cent. Apples need more oxygen than pears, and oranges than apples, &c., depending upon the peculiarities and natures of the different articles and upon the rapidity of development, &c.

Nitrogen is supplied to the substances to be preserved, because of the existence of that gas in atmospheric air and the necessity of having a percentage thereof to dilute the oxygen or life-giving gas, while the carbon monoxid is supplied, primarily, as an antiseptic, and, secondarily, as an agent capable of producing that condition of suspended animation which is necessary in order to carry out the provisions of our method. This agent, if in too great proportion, will result in extinguishing life completely.

The apparatus necessary for supplying a receptacle, such as a storage-inclosure, with the above-named gases and for controlling the admission thereof to obtain the required proportions to suit the different substances under treatment forms no part of our present invention, but we have found that all of the necessary conditions may be carried out by introducing properly-purified atmospheric air after passing the same through a column of incandescent carbon. The first effect of the contact of air with the carbon is to produce carbonic-acid gas or carbonic anhydrid, (CO$_2$,) and the contact of this gas with the heated charcoal as it passes on through the apparatus causes the reduction thereof and the final escape of carbonic oxid (CO) with nitrogen in approximately the proportions above named—that is, seventy-six to twenty. The oxygen may be supplied in the form of purified atmospheric air by gaging its admission to secure the required percentage of the oxygen, but is preferably introduced after exposure to a rubber diaphragm which eliminates the nitrogen, for which rubber has a strong affinity. Furthermore, in carrying out our process we find that it is necessary to either continuously supply the gases in the proper proportions and at the same time continuously remove the exhausted or stale gases or to repeatedly change the atmosphere in the inclosure at intervals of, say, once to three times a day; but we have also found that it is expedient to occasionally open the receptacle or inclosure in which the fruit or other substances are contained and expose the same to atmospheric air for a period of a few hours or a day or more to partially revive the contents and then resubject them to the preserving fluid or atmosphere composed as above set forth. Suitable tests should be instituted at intervals, as twice or three times a day, to ascertain the percentages of the various gaseous contents of the receptacle or inclosure in which the substances under treatment are contained in order to avoid the accumulation of carbonic-acid gas or carbonic anhydrid, as the effect of this gas is to interfere with the continuance of that revivable existence which is necessary to the future development of the substances. Suitable gages may be employed in connection with the storage apparatus for testing the percentages of the gases and for detecting the existence of a surplus of carbonic-acid gas, which would indicate a change in the condition of the fruit, and as the object of our invention is to prevent a change in the condition of the fruit and maintain it precisely as when first exposed to the process such existence of a surplus of carbonic-acid gas would show that the proportions of gaseous contents of the receptacle were unsuited to the fruit.

As above indicated, the proportions of the ingredients of the preserving fluid vary according to the temperature under which the substances are maintained, as the same fruit will consume more oxygen at a high temperature than it will at a low temperature; but within certain limits the temperature must be suited to the particular kind of fruit which is being preserved, those which are indigenous to southern latitudes requiring a higher temperature than those which are grown in northern latitudes, but the existence of a low temperature, as in cold storage, is not necessary to the proper carrying out of our process. It is not our object to preserve organic substances by neutralizing the natural heat of the fruit due to combustion or the consumption of oxygen, but to limit the quantity of oxygen which is supplied to the substances to such a point as to simply supply the waste and prevent the extinction of life, and yet insufficient to promote development.

In shipping articles of a perishable nature they may be exposed to the preserving fluid in transit, but particularly when the time required for shipment is comparatively short we have found that the desired effect is produced by exposing the substances temporarily to the preserving fluid or subjecting them to the preserving process above described and then transporting them under normal conditions for the reason that after removal of fruit and analogous substances from the preserving fluid they recover slowly from the effects thereof, and hence for a considerable time the development is very slow. For instance, we have found in practice that green bananas, as they are imported, will in a warm normal atmosphere ripen in, say, three days, whereas a bunch of bananas in the same condition of development if treated in accordance with our process for three days will, when subsequently exposed to the same warm normal atmosphere, require from ten days to two weeks to reach a perfect state of ripeness, but the ultimate ripened condition is as perfect as that of the fruit which has not been exposed to the treatment contemplated in our process.

While in the above description we have referred more particularly to the application of our process in the preservation of fruits, vegetables, and the like, it will be understood that it is equally applicable to grain, cereals, seeds, hops, dried fruits, nuts, meat, skins, furs, fabrics, such as silks and woolen goods, and also to milk, eggs, and other animal products. Obviously in its application to objects having no life the effect of the process is to destroy insects—such as weevils, moths, &c.—and in its application to dried fruits, &c., it prevents oxidation, and hence decay.

As above mentioned, the preserving fluid may be used in connection with fruits or other organic substances packed in portable receptacles for transportation, and under these or other conditions, and particularly in connecction with grapes and berries, we have found it desirable to apply the fluid under pressure greater than one atmosphere, in some instances a pressure of three or more atmospheres being desirable.

Having described our invention, what we claim is—

The process of preserving alimentary substances, which consists in subjecting them to the action of a gaseous mixture, composed of nitrogen, carbonic oxid and oxygen in substantially the proportions specified.

In testimony that we claim the foregoing as our own we have hereto affixed our signatures in the presence of witnesses.

ALBERT L. LAWTON.
ARTHUR W. LAWTON.

Witnesses for A. L. Lawton:
   GEORGE POWELL,
   RICHARD BULLEN.
Witnesses for A. W. Lawton:
   JOHN H. SIGGERS,
   FRANCES PEYTON SMITH.